(12) United States Patent
Cassaro et al.

(10) Patent No.: US 7,703,544 B2
(45) Date of Patent: Apr. 27, 2010

(54) METHOD FOR SHAPING A LEATHER

(75) Inventors: Jonathan Cassaro, Presles (FR); Claire Bovyn, Méru (FR)

(73) Assignee: Faurecia Interieur Industrie, Nanterre (FR)

( * ) Notice: Subject to any disclaimer, the term of this patent is extended or adjusted under 35 U.S.C. 154(b) by 96 days.

(21) Appl. No.: 11/996,373

(22) PCT Filed: Jul. 20, 2006

(86) PCT No.: PCT/FR2006/001779

§ 371 (c)(1),
(2), (4) Date: Jan. 22, 2008

(87) PCT Pub. No.: WO2007/010142

PCT Pub. Date: Jan. 25, 2007

(65) Prior Publication Data

US 2008/0209955 A1    Sep. 4, 2008

(30) Foreign Application Priority Data

Jul. 22, 2005    (FR) ................... 05 07835

(51) Int. Cl.
*C14B 1/44*    (2006.01)

(52) U.S. Cl. ....................................................... 169/33
(58) Field of Classification Search ................. 69/33; 428/71
See application file for complete search history.

(56) References Cited

U.S. PATENT DOCUMENTS 4,409,163 A * 10/1983 Van Manen ................ 264/45.5
5,922,431 A    7/1999 Funato et al.

FOREIGN PATENT DOCUMENTS

DE           199 26 470 A1    12/2000

* cited by examiner

*Primary Examiner*—Shaun R Hurley
(74) *Attorney, Agent, or Firm*—Young & Thompson

(57) ABSTRACT

Method for setting a leather skin (12) having an outer surface designed to be visible, includes a step of applying a rigidity increasing treatment, a step of setting the skin using a mould cooperating with the outer surface of the skin (12), one at least of the two steps being executed only locally at an elongated part (B) spaced apart from the edge of the skin (12) and substantially parallel to the edge, and a step for facilitating the maintenance of the shape by locally applying a shape maintaining material to the inner surface of the skin (12), in particular a thermoplastic resin (24). The invention is useful for making automotive interior trim.

15 Claims, 2 Drawing Sheets

METHOD FOR SHAPING A LEATHER

CROSS-REFERENCE TO RELATED APPLICATIONS

The present Application incorporates by reference and claims benefit of priority to PCT/FR2006/001779 filed Jul. 20, 2006 and French Patent Application 05/07835 filed Jul. 22, 2005.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The invention relates to shaping a leather skin which is intended to be incorporated in a trim component, in particular of the type which comprises a rigid support which delimits a cavity, a leather skin, one edge of which is applied against a rigid support in the cavity, and a foam which is arranged between the rigid support and the leather skin.

2. Description of Related Art

Components of the above-mentioned type having skins of plastics material are commonly used for various automotive trims, in particular for dashboards and door trims. Substantially for reasons of aesthetics, it is desirable to use leather as the skin. However, this presents a given number of problems because it is constituted by a natural material which has variations in properties and it is therefore necessary to carry out specific treatments.

In the case of the above-mentioned components, examples of which are illustrated in the drawings of FIGS. 1 and 2, a rigid support 10 which is generally formed by a thermoplastic material retains a skin 12 at the edge 14 thereof, and a foam 16 is arranged between the support 10 and the leather skin 12. In a developed method, the pressure of the foam 16 injected between the rigid support and the skin is what presses the edge 14 of the leather against the support 10 and ensures sealing.

In the case of skins of plastics material, it is known to determine conditions such that the foam does not tend to become introduced between the skin and the support. However, in the case of leather whose properties may vary from one piece to the next, it is necessary to provide for operations which always ensure good sealing between the edge of the skin, more specifically the outer surface 18 thereof which is generally the grain, and the rigid support.

It has been suggested, in order to improve the flexibility of the edge of the skin and therefore to obtain better sealing, to apply to the edge of the leather skin a paring operation, that is to say, an inclined incision of the edge whose thickness thereby decreases progressively towards the edge, as indicated by the reference 20 in FIG. 2. However, this solution is not always sufficient, in particular when the leather is not very pliable.

When such a trim component is observed, it is possible to distinguish three regions in the leather skin, a sealing region A in which the outer face of the skin must be pressed against the rigid support, ensuring the sealing with respect to the injected foam whilst allowing air to be discharged from the cavity, a region B in which the skin has a change in direction, and a region C in which the skin is practically in continuation of an outer surface of the rigid component which surrounds it.

Owing to variations in the properties of leather from one piece to the next, the region B may have variable properties so that good sealing is not always provided and the foam can appear between the skin and the rigid support.

Document EP-145 560 describes a method for shaping leather in the region of a sole of a shoe. Document WO2004/097053 relates to a method for finishing leather objects by localised processing of the edges only. Document GB-1 027 801 describes an operation for processing leather by means of water or water vapour applied only to regions of leather components. Document DE-19 926 470 describes the application of protective layers to the inner face of a decorative coating, in which the portions which must not be shaped are made rigid.

None of these documents allows the problem addressed to be solved by managing the shape of a leather skin beside a fluid-tight cooperation region between a leather skin and a rigid support by means of simple pressure, and more specifically managing the portion of skin in the region B so that the fluid-tight cooperation conditions in the region A are optimised.

The invention relates to a solution to this problem addressed, by varying the sealing between a leather skin and the rigid support.

BRIEF SUMMARY OF THE INVENTION

To that end, the invention carries out a step for shaping the skin in the region B and a step for applying a processing operation for increasing rigidity in this region B, so that maintaining the shape of the peripheral portion or region A is facilitated.

In some embodiments, the step for increasing rigidity precedes the shaping step, and in other embodiments it follows it.

In greater detail, the invention relates to a method for shaping a leather skin having an outer face which is intended to be visible and an inner face, the method being of the type which comprises a step for applying a processing operation for increasing rigidity, and a step for shaping the skin by means of a mould which cooperates with the outer face of the skin; according to the invention, at least one of the two above-mentioned steps is carried out only locally at an elongate location which is remote from an edge of the skin and which is substantially parallel with that edge, and the method also comprises a step which is intended to facilitate the shape maintenance.

In one embodiment, the step for applying a processing operation for increasing rigidity is carried out before the shaping step and comprises local application of a shape-maintaining material to the inner face of the skin.

In a variant, the shape-maintaining material is a thermoplastic resin, the thickness of which is advantageously in the order of 1 mm.

In another variant, the shape-maintaining material is constituted by an adhesive and a thermoplastic reinforcement. Preferably, the thermoplastic reinforcement is a thermally ductile strip, for example, formed from a textile impregnated with a thermoplastic material, such as a polyolefin.

In this embodiment, the step which is intended to facilitate shape maintenance advantageously comprises a cooling operation, after a heating step and the step for shaping on a mould. For example, the heating step is carried out at a temperature between 60 and 100° C. That heating step can be carried out generally in an oven, or locally by means of a directed heat source.

In another embodiment, the shape-maintaining material is an aluminium strip which is adhesively bonded locally to the inner face of the leather skin.

In another embodiment, the step for applying a processing operation for increasing rigidity is carried out after the step for shaping the skin, and it comprises local compression of the leather skin at said elongate location remote from an edge of the skin. That local compression can be carried out by applying a pressure or by means of dressing by hammering.

In another embodiment, the step for applying a processing operation for increasing rigidity is carried out after the step for shaping the skin, the method comprises local application of a shape-maintaining material to the inner face of the skin, and the method comprises drying the shape-maintaining material, for example, adhesive, when the leather skin has the desired shape.

In another embodiment, the step for applying a processing operation for increasing rigidity is carried out after the step for shaping the skin and comprises local application, to the inner face of the leather skin, of an impregnation material, then drying the impregnation material. Preferably, the impregnation material is a fluid containing a protein, for example, casein.

In all the embodiments, it is advantageous for the method also to comprise a step for cutting the edge in an inclined direction, in at least a portion of the leather skin between the elongate location which is remote from an edge and that edge, so that the thickness of the skin progressively decreases towards the edge.

BRIEF DESCRIPTION OF THE SEVERAL VIEWS OF THE DRAWING

Other features and advantages of the invention will be better understood from a reading of the following description of embodiments with reference to the appended drawings, in which, FIGS. 1 and 2 already having been described:

FIGS. 3 and 4 illustrate a first embodiment of the method according to the invention.

DETAILED DESCRIPTION OF THE INVENTION

Figure 1:
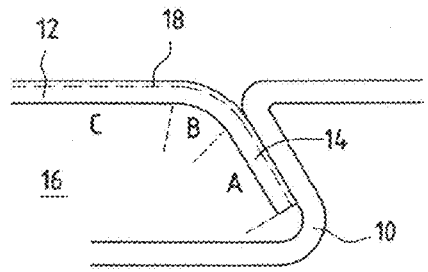

A leather skin 12 is arranged in the flat state and is subjected, in the region B, to local application, for example, by means of an atomising device 22, of a thermoplastic resin 24 which forms a layer having a thickness in the order of 1 mm, for example, between a few tenths of a millimeter and two or three millimeters. The thermoplastic material may be inexpensive, for example, polyvinyl chloride, a polyolefin such as polyethylene, or a polyurethane, for example. The skin having the layer of resin is normally kept in the flat state; when it has to be used, it is introduced into an oven in which its temperature is brought to between 60 and 100° C., depending on the nature of the thermoplastic material of the layer 24. The heating can also be carried out locally by means of a local heating device, for example, an infrared or resistance type device.

When the thermoplastic material has been softened, the skin 12 is placed in a mould which has the shape which the skin must adopt in the regions A, B and C. The whole is then cooled so that the thermoplastic material 24 retains the curved shape which it has taken up and the skin therefore has a rounded shape in the region B. In one example, this region B forms, in a plane perpendicular to the plane of the drawing, a practically continuous contour, remote from the edge. The thermoplastic material thereby forms a layer 24 of small width (corresponding to region B) over a contour which follows the edge of the leather skin, but remote from that edge.

Figure 3:
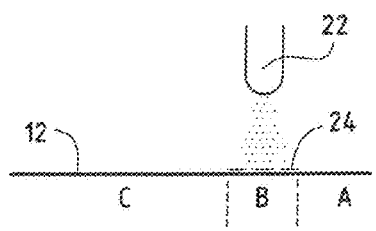
FIGS. 3 and 4 are schematic illustrations of a first embodiment of the method of the invention.
Figure 4:
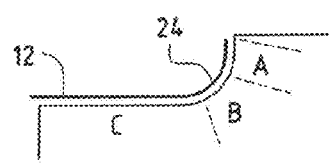
Figure 5:
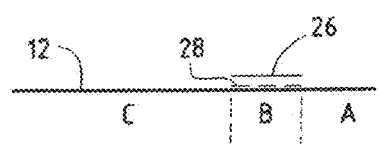
FIG. 5 is a schematic illustration of a variant of the method described with reference to FIGS. 3 and 4.

FIG. 5 illustrates a variant of the embodiment described with reference to FIGS. 3 and 4. In this variant, the layer 24 of thermoplastic material is replaced with a reinforcement 26 which is adhesively bonded to the skin 12 by a layer of adhesive 28. The reinforcement 26 may be a strip of a thermally ductile material. For example, the reinforcement 26 can be formed by a textile strip impregnated with a thermoplastic material, for example, a polyolefin.

As described with reference to FIGS. 3 and 4, when the reinforcement 26 has been adhesively bonded in the region B, the skin 12 can be kept in the flat state until it is used. At that time, the skin 12 can be heated, by being passed into an oven as indicated with reference to FIGS. 3 and 4, or simply locally, in the region B, so that it can be shaped, in the manner indicated in FIG. 4. After cooling, the reinforcement 26 becomes rigid and maintains the region B of the skin in the shape corresponding to that of the mould.

In the embodiments described, the plastics material and the adhesive are applied to the inner face of the skin, that is to say, to the face which must not be visible, and they cannot migrate as far as the visible face. In that manner, the presence of the resin or adhesive is not apparent at the outer side of the finished component which therefore has a beautiful appearance.

Figure 6:
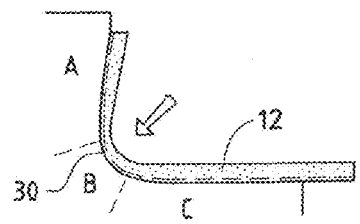
FIG. 6 illustrates an essential step of a second embodiment of the method according to the invention.

FIG. 6 illustrates a second embodiment of the invention. In this case, a skin 12 is arranged against a mould so that it is applied against the surface of the shaping mould in the regions A, B and C. In this case, the step for increasing rigidity comprises local compression of the leather skin, at the location 30. Leather is a fibrous material and, when it is compressed, for example, by a pressure being applied or by dressing by hammering, its rigidity increases at the location of reduced thickness.

When the leather skin 12 illustrated in FIG. 6, which is compressed in the region 30 by means of compression or dressing by hammering, is removed from the mould, it retains practically the shape indicated in FIG. 6 or at least a broadly curved shape in region B.

Figure 7:
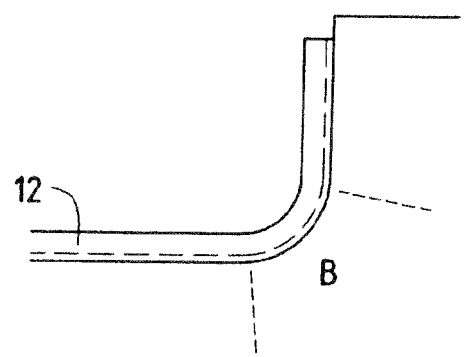
FIGS. 7 and 8 illustrate a third embodiment of the method according to the invention.
Figure 8:
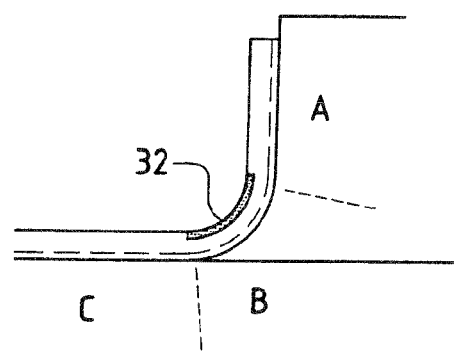

FIGS. 7 and 8 illustrate a third embodiment of the invention. Whereas, with reference to FIGS. 3 to 5, an embodiment has been described in which the increase in rigidity is obtained by cooling, the embodiment of FIGS. 7 and 8 corresponds to an increase in rigidity by local application of a shape-maintaining material.

In the example of these Figures, an impregnation liquid in the form of an aqueous dispersion of a rigidifying substance (which may be natural, such as proteins, such as casein and amylum, or synthetic such as polyurethane) is applied by means of a brush, to the inner surface of the rounded portion of the leather component 12 illustrated in FIG. 7, that is to say, in the region B. The concentration of protein, such as casein, and the quantity of liquid applied are such that the solution penetrates into the leather over only a portion of the thickness thereof. As FIG. 8 indicates, the protein thereby penetrates over a rounded portion 32 of the region 20, at the inner face of the skin, without reaching the outer face. The skin held by the mould as indicated in FIG. 7 is then subjected to a drying operation and, when the layer 32 has dried, it ensures the leather maintains its shape in the region B as indicated in FIG. 8.

Figure 9:
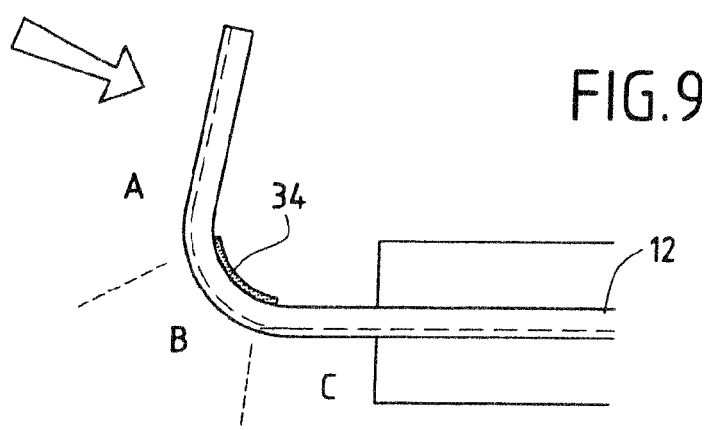
FIG. 9 is a schematic illustration of a fourth embodiment of the method according to the invention.

FIG. 9 illustrates a fifth embodiment which combines several of the preceding embodiments. In this case, the skin 12 is maintained in such a manner that its peripheral portion, comprising at least the regions A and B, is free. A layer of adhesive 34 is applied to the inner face and shaping of the skin confers on it the desired shape in its peripheral region. That shaping is illustrated by an arrow which indicates either the application of a pressure near the edge of the skin, or even dressing by hammering, that operation being carried out until the adhesive 34 has practically dried. At that time, the adhesive 34 ensures that the region B retains a rounded shape.

In a variant of the various preceding embodiments, it is also possible to adhesively bond, in the region B of the leather skin 12, a strip of annealed aluminium which is rigid enough, when it has been shaped, to maintain the leather skin in the shape into which it has been shaped. That adhesion of an aluminium strip can be carried out either in a mould as illustrated in FIGS. 7 and 8 or outside a mould as illustrated in FIG. 9.

Figure 2:
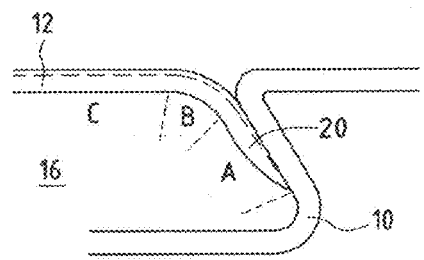

In all the embodiments, it is advantageous for the edge of the skin to be cut in an inclined direction as illustrated in FIG. 2, so that the thickness of the skin progressively decreases towards the edge. The combination of the correct orientation of the region of edge A given by the rounded region B with the progressively increasing flexibility towards the edge provides a synergistic effect which allows that region A, firstly, to allow air to pass by forming a vent and, secondly, to stop the foam during manufacture.

In this manner, all the embodiments described allow management of the shape of the skin portion in the region B so that the fluid-tight cooperation conditions in the region A are optimised.

The invention claimed is:

1. A method for shaping a leather skin having an outer face which is intended to be visible and an inner face, comprises comprising the following steps:
   applying a treatment only locally to a first elongate region of the inner face of the leather skin, the first elongate region, being located remote from the edge of the skin and substantially parallel to the skin, without applying the treatment to the region of the skin located between the first elongate region and the edge of the skin; and
   shaping the skin by means of a mould which cooperate with the outer face of the skin, such that the first elongate region is a region of the skin with a change of direction, the treatment increasing the rigidity of the first elongate region at least after the shaping of the skin.

2. The method according to claim 1, wherein the step for applying a processing operation for increasing rigidity is carried out before the shaping step and comprises local application of a shape-maintaining material (24, 26) to the inner face of the skin.

3. The method according to claim 2, wherein the local application of a shape-maintaining material is the application of a thermoplastic resin (24).

4. The method according to claim 2, wherein the local application of a shape-maintaining material is the application of an adhesive (28) and a thermoplastic reinforcement (26).

5. The method according to claim 2, wherein the step which is intended to facilitate the shape maintenance comprises a cooling operation, after a heating step and the step for shaping on a mould.

6. The method according to claim 2, wherein the local application of a shape-maintaining material is the application of an aluminum strip which is adhesively bonded locally to the inner face of the leather skin.

7. The method according to claim 1, wherein the step for applying a processing operation for increasing rigidity is carried out after the step for shaping the skin, and comprises local compression (30) of the leather skin at said first elongate region remote from an edge of the skin.

8. The method according to claim 1, wherein the step for applying a processing operation for increasing rigidity is carried out after the step for shaping the skin, the method comprises local application of a shape-maintaining material (34) to the inner face of the skin, and the method comprises drying the shape-maintaining material (34) when the leather skin has the desired shape.

9. The method according to claim 1, wherein the step for applying a processing operation for increasing rigidity is carried out after the step for shaping the skin and comprises local application, to the inner face of the leather skin, of an impregnation material (32), then drying the impregnation material (32).

10. The method according to claim 1, further comprising a step for cutting the edge (20) in an inclined direction, in at least a portion of the leather skin between the first elongate region which is remote from an edge and that edge, so that the thickness of the skin progressively decreases towards the edge.

11. The method according to claim 3, wherein the step which is intended to facilitate the shape maintenance comprises a cooling operation, after a heating step and the step for shaping on a mould.

12. The method according to claim 4, wherein the step which is intended to facilitate the shape maintenance comprises a cooling operation, after a heating step and the step for shaping on a mould.

13. The method according to claim 2, further comprising a step for cutting the edge (20) in an inclined direction, in at least a portion of the leather skin between the first elongate region which is remote from an edge and that edge, so that the thickness of the skin progressively decreases towards the edge.

14. The method according to claim 1, wherein the method further comprises:
   facilitating the shape maintenance of the skin.

15. A method for manufacturing a trim component for an automotive vehicle, comprising:
   applying a treatment only locally to a first elongate region of the inner face of a leather skin, the first elongate region, being located remote from the edge of the skin and substantially parallel to the skin, without applying the treatment to the region of the skin located between the first elongate region and the edge of the skin;
   shaping the skin by means of a mould which cooperate with an outer face of the skin, such that a first elongate region is a region of the skin with a change of direction, the treatment increasing the rigidity of the first elongate region at least after the shaping of the skin;

retaining the skin at the edge of a rigid support formed by a thermoplastic material; and a step of injecting a foam layer between the rigid support and the skin.

* * * * *